R. BURNS.
ROASTER FOR COFFEE AND OTHER MATERIAL.
APPLICATION FILED SEPT. 17, 1908.

932,957.

Patented Aug. 31, 1909.
2 SHEETS—SHEET 1.

WITNESSES:
William Miller
Christian Almstaedt

INVENTOR
Robert Burns
BY
W. C. Hauff
ATTORNEY

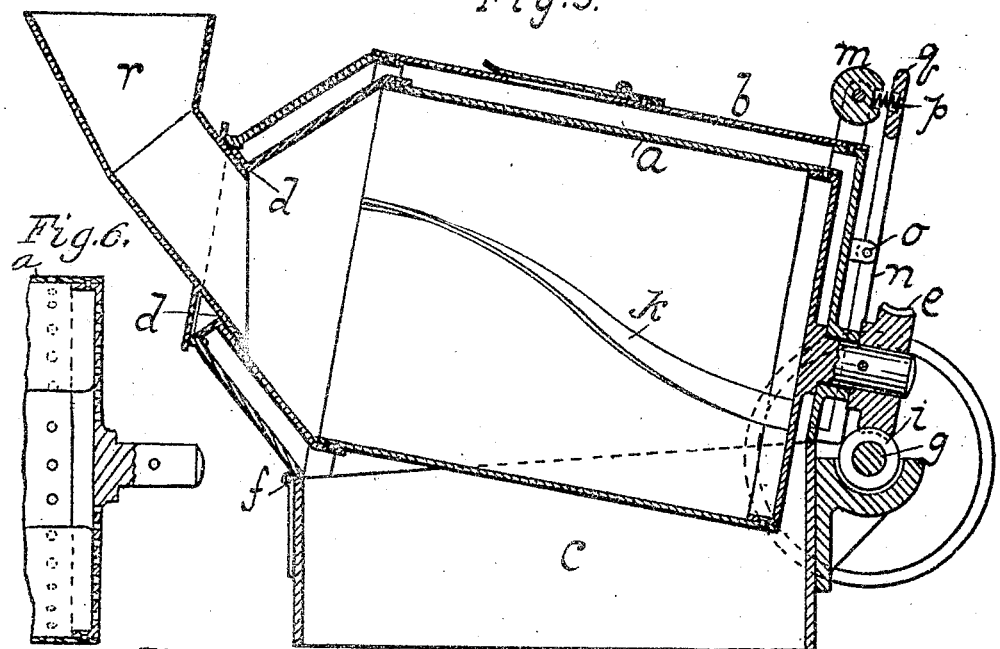
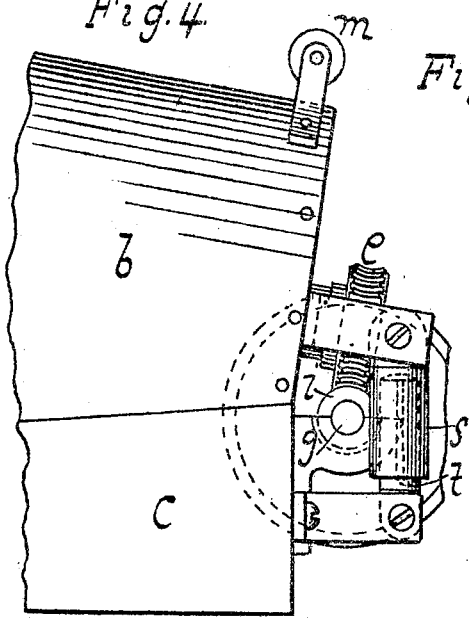
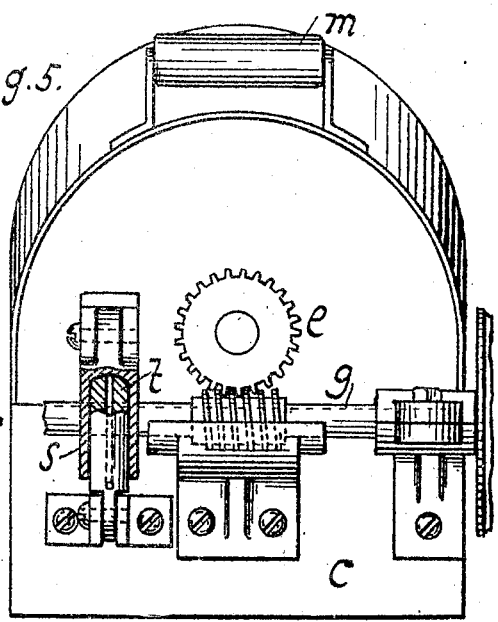

UNITED STATES PATENT OFFICE.

ROBERT BURNS, OF NEW YORK, N. Y., ASSIGNOR TO JABEZ BURNS & SONS, OF NEW YORK, N. Y., A CORPORATION OF NEW YORK.

ROASTER FOR COFFEE AND OTHER MATERIAL.

932,957.   Specification of Letters Patent.   Patented Aug. 31, 1909.

Application filed September 17, 1908. Serial No. 453,382.

*To all whom it may concern:*

Be it known that I, ROBERT BURNS, a citizen of the United States, residing at New York, in the county of New York and State of New York, have invented new and useful Improvements in Roasters for Coffee and other Material, of which the following is a specification.

This invention relates to a roaster for coffee and other material as for example nuts, grain or the like and such roaster presents several advantages as for example easy feeding and emptying, ready starting and arresting and other features appearing in the following specification and claims and illustrated in the annexed drawing in which:—

Figure 1:
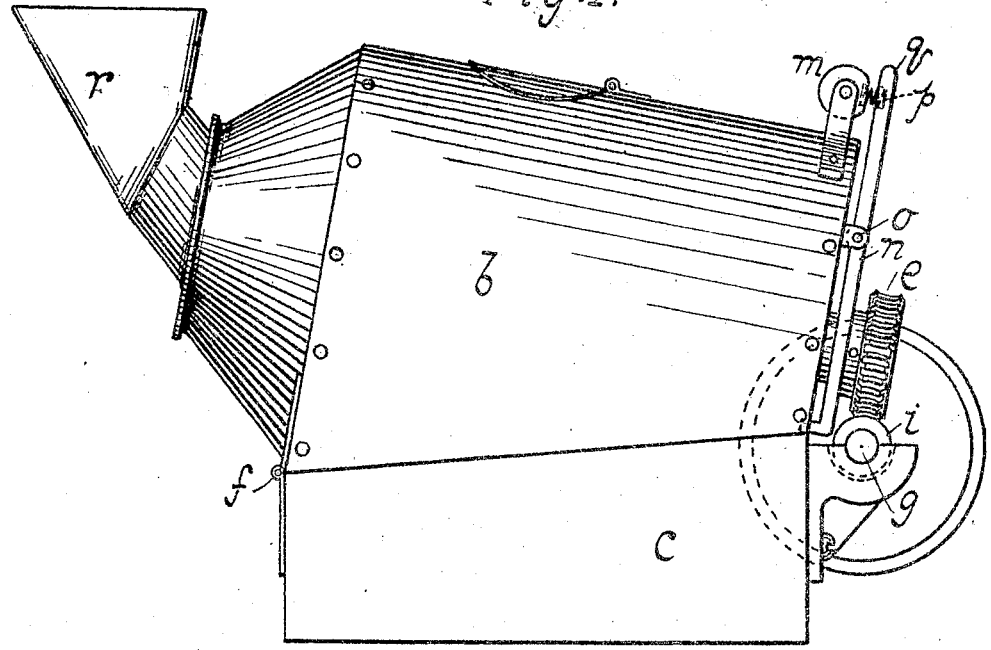
Figure 2:
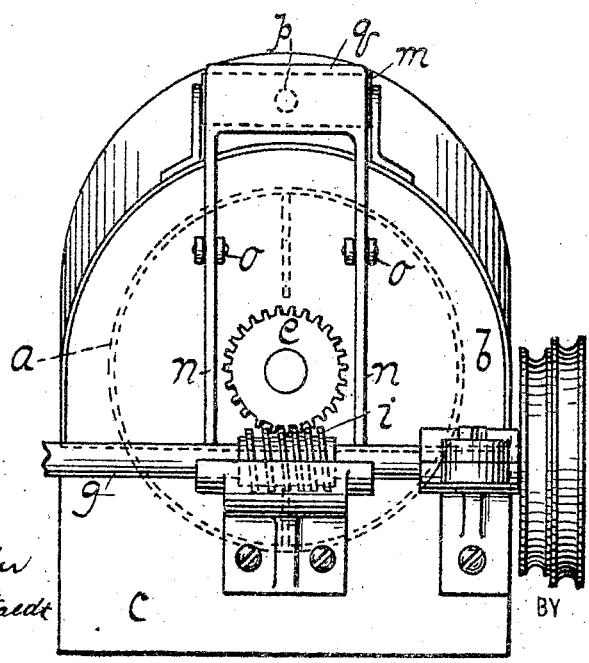

Figure 1 shows a side elevation of a roaster embodying this invention. Fig. 2 is a rear elevation of Fig. 1. Fig. 3 is a sectional side elevation of Fig. 1. Fig. 4 shows a modification. Fig. 5 is a section of the air cushion shown in Fig. 4. Fig. 6 is a sectional view of the rear end of a modified form of roaster shell.

In this drawing is shown a roaster proper or shell $a$ rotatively mounted in the upper section $b$ of a casing $b$ $c$. Suitable heating means for the roaster may be provided, but inasmuch as such forms no part of this invention, it is not shown in the drawings. One end portion of the shell $a$ is provided with a mouth of considerable size so as to allow for easy introduction and dumping of material, the edge or rim portion of the mouth being indicated at $d$. This mouth portion sits rotatively in the corresponding mouth portion of casing $b$. The rear wall of the shell has a shaft with gear or worm wheel $e$ engaging a motor as presently explained. The shaft of wheel $e$ extends through the rear wall of case section $b$ and said section hinges or can swing at $f$ on section $c$. If section $b$ swings up shell $a$ swings therewith and can empty or dump through opening $d$.

When the section $b$ swings down or shut the worm wheel $e$ carried by the shell also swings down and comes to gear or mesh with the motor mounted in section $b$ and shown as a worm shaft $g$ with worm $i$. As wheel $e$ descends and takes worm $i$ the resulting rotation of the wheel turns the roaster shell $a$.

The roaster as seen is arranged to hold the shell $a$ at a tilt to incline from front to rear and as the shell rotates material entering at the mouth will tend to work to the rear. Spirally arranged blades $k$ on the interior of the shell $a$ serve to work the material forward and to thoroughly mix the same.

At the rear the worm blade can be of greater height than at the front as the layer of material tends to heap up at the rear.

The roaster can be either in form of a perforated shell for the escape of steam or vapors in roasting, as shown in Fig. 6, or in case the apparatus is to be used for fine material which is liable to sift, the shell can be closed and the mouth at $d$ depended upon for the necessary escape.

The roaster or shell $a$ as stated dumps when the upper section $b$ is swung up about pivot $f$ and a handle $m$ can raise such rear end of the section $b$. As the roaster swings up worm wheel $e$ unmeshes from its motor $i$ and on return of the roaster this wheel reengages. If the case section $b$ should suddenly drop the gears $e$ $i$ might be injured. An arresting finger can prevent the dropping wheel $e$ from slamming onto its motor. This arresting finger is formed by the lower or free end of a lever $n$ fulcrumed at $o$, such lower end being bent to form an L shape. The horizontal bar of this L entering in the space between the contact lips of section $b$ and section $c$ before they are closed keeps these lips separated and prevents wheel $e$ touching its motor.

The arresting position of the L shaped terminal is normally maintained by spring $p$ between handle part $q$ of lever $n$ and the handle $m$ and when the handles $m$ $q$ are grasped and pressed together the arresting piece is withdrawn from the sections $b$ $c$ and they can be closed together when the wheel $e$ will again begin to rotate. The lever $n$ is shown as comprising two legs or lower arms but the action is as described.

To fill the roaster a funnel $r$ can be held to mouth $d$ and withdrawn when the filling is finished to be applied to another roaster, such roasters being at times arranged in series. By having the motor shaft $g$ extended along a suitable distance with a required number of worms a number of roasters can be driven by such motor. The funnel $r$ has its discharge spout or inlet downwardly inclined and the mouth from its edge or ridge part flares both inwardly as also outwardly to fit the funnel discharge. A neat fitting funnel and rapid filling or feeding can thus be obtained.

In the modification the arresting stop $n$ is replaced by an air cushion. A tube or socket $s$ is shown at or pivoted to the section $b$ and a piston $t$ filling the tube is shown at section $c$. When section $b$ drops or starts to slam the piston $t$ enters and compresses the air in the tube or the tube slips over the piston and eases the closing of the sections. In either case a slam is prevented.

In the case of Fig. 4 a block placed between the gaping lips of sections $b\ c$ will hold the gear $e$ idle if desired. At the same time excessive escape of heat from the casing $b\ c$ is avoided such as would occur if the casing were left entirely open. For easing the descent of the upper section if an air cushion is used the piston $t$ can have a small channel or air vent if desired. The back head of the shell $a$ may be perforated if desired the same as the rest of the shell as thereby less metal is contained in the shell thus absorbing less heat.

What I claim is:—

1. A roaster for coffee and other material having a hollow bearing of such size as to form an opening suitable for feeding and for dumping, the edge portions of said opening from the mouth outward and from said mouth inward being placed at such an angle as to permit ready entrance for feeding, said edge portions being adapted to receive a filling funnel having a discharge portion made to fit the angularly placed edge portions.

2. A roaster for coffee and other material comprising a shell or body portion and case made to surround and to swing with the shell to allow dumping of the contents.

3. A roaster comprising a shell and a case about the shell, the case being made in sections hinged to one another, one of the sections having a rotating gear for actuating the shell, and the other section having a motor for rotating the gear.

4. A roaster comprising a shell and a case about the shell, the case being made in sections hinged to one another, one of the sections having a rotating gear for actuating the shell and the other section having a motor for rotating the gear, said gear being made to release and reëngage the motor as the sections open and close.

5. A roaster comprising a shell and a case about the shell, the case being made in sections hinged to one another, one of the sections having a rotating gear for actuating the shell and the other section having a motor for rotating the gear, said gear being made to release and reëngage the motor as the sections open and close and an arresting device for holding the sections separated with the gear out of engagement.

6. A roaster comprising a shell and a case made in hinged sections, a handle at the rear of one of the sections to lift or open the section away from the other one and a spring closed lever with its handle in proximity to the other handle, said lever having an arresting piece adapted to enter between the case sections.

In testimony whereof I have hereunto set my hand in the presence of two subscribing witnesses.

ROBERT BURNS.

Witnesses:
  EDWARD WIESNER,
  CHRISTIAN ALMSTAEDT.